US012295407B2

(12) United States Patent
Caprini

(10) Patent No.: US 12,295,407 B2
(45) Date of Patent: May 13, 2025

(54) FILTER MANUFACTURING APPARATUS

(71) Applicant: PHILIP MORRIS PRODUCTS S.A., Neuchatel (CH)

(72) Inventor: Gianni Caprini, Zola Predosa (IT)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 18/093,496

(22) Filed: Jan. 5, 2023

(65) Prior Publication Data

US 2023/0147675 A1 May 11, 2023

Related U.S. Application Data

(62) Division of application No. 16/066,452, filed as application No. PCT/EP2016/082787 on Dec. 28, 2016, now Pat. No. 11,559,078.

(30) Foreign Application Priority Data

Dec. 30, 2015 (EP) .................................... 15203076

(51) Int. Cl.
*A24D 3/02* (2006.01)
*B31D 5/00* (2017.01)

(52) U.S. Cl.
CPC ......... *A24D 3/0233* (2013.01); *A24D 3/0295* (2013.01); *B31D 5/0082* (2013.01)

(58) Field of Classification Search
CPC .......... B31D 5/0082; B31D 2205/0035; B31D 2205/0088; A24D 3/0233; A24D 3/0295;
(Continued)

(56) References Cited

U.S. PATENT DOCUMENTS 3,095,343 A 6/1963 Berger
3,345,917 A 10/1967 Agett
(Continued)

FOREIGN PATENT DOCUMENTS

EP 0555875 8/1993
EP 2057908 5/2009
(Continued)

OTHER PUBLICATIONS

PCT Search Report and Written Opinion for PCT/EP2016/082787 dated Apr. 21, 2017 (12 pages).
(Continued)

*Primary Examiner* — Sameh Tawfik
(74) *Attorney, Agent, or Firm* — Mueting Raasch Group

(57) ABSTRACT

The invention relates to a filter manufacturing apparatus including a feed path adapted to continuously feed a filter material along a longitudinal transport direction, and a forming device connected to a terminating end of the feed path and adapted to form the filter material into a rod-shaped continuous filter body and deliver the formed continuous filter body. The forming device includes: a tubular element adapted to allow the filter material to pass therethrough to form the filter material into the continuous filter body; a heat source adapted to heat the filter material passing in the tubular element. A diameter measuring device is positioned at the outlet of the forming device and adapted to measure a diameter of the continuous filter body.

10 Claims, 2 Drawing Sheets

(58) Field of Classification Search
CPC ...... A24D 3/02; A24D 3/0212; A24D 3/0279; A24D 3/06; B31F 1/128; B31F 1/126; B31F 1/122
USPC ........................................................... 493/42
See application file for complete search history.

(56) References Cited

U.S. PATENT DOCUMENTS

| | | | | | |
|---|---|---|---|---|---|
| 3,380,351 | A | | 4/1968 | Cox | |
| 3,921,644 | A | | 11/1975 | Von der Lohe | |
| 3,999,134 | A | * | 12/1976 | Lorenzen | A24B 9/00 209/535 |
| 4,086,846 | A | | 5/1978 | Hall | |
| 4,196,740 | A | | 4/1980 | Rudszinat | |
| 4,326,542 | A | * | 4/1982 | Laszlo | A24C 5/34 131/908 |
| 4,503,868 | A | * | 3/1985 | Coyte | A24C 5/34 209/535 |
| 4,548,215 | A | * | 10/1985 | Adebahr | A24C 5/1871 131/84.1 |
| 4,549,875 | A | * | 10/1985 | Pryor | A24D 3/022 493/44 |
| 4,676,769 | A | * | 6/1987 | Bahr | A24D 3/0295 493/42 |
| 4,848,626 | A | | 8/1989 | Neri | |
| 4,865,054 | A | | 9/1989 | Lorenzen | |
| 4,974,443 | A | * | 12/1990 | Heitmann | G01N 3/42 131/906 |
| 5,116,298 | A | | 5/1992 | Bondanelli | |
| 5,746,225 | A | | 5/1998 | Okumoto | |
| 6,152,145 | A | | 11/2000 | Focke | |
| 6,647,870 | B2 | * | 11/2003 | Kohno | B30B 1/23 100/35 |
| 7,074,170 | B2 | * | 7/2006 | Lanier, Jr. | A24D 3/022 493/44 |
| 7,093,625 | B2 | * | 8/2006 | Smith | B65B 1/366 141/73 |
| 7,547,271 | B2 | * | 6/2009 | Kato | A24D 3/0225 493/42 |
| 8,574,141 | B2 | * | 11/2013 | Barnes | A24D 3/025 493/47 |
| 8,992,400 | B2 | * | 3/2015 | Righetti | A24D 3/0287 493/47 |
| 2006/0124143 | A1 | * | 6/2006 | Sherron | A24B 3/12 131/309 |
| 2006/0135335 | A1 | * | 6/2006 | Dawson | A24D 3/0216 493/39 |
| 2007/0284012 | A1 | * | 12/2007 | Smith | B65B 1/366 141/1 |
| 2014/0034571 | A1 | | 2/2014 | Torai | |
| 2014/0171281 | A1 | * | 6/2014 | Park | A24D 3/0258 493/42 |

FOREIGN PATENT DOCUMENTS

| | | |
|---|---|---|
| EP | 2692249 | 2/2014 |
| EP | 2893820 | 7/2015 |
| JP | 5522765 | 6/2014 |

OTHER PUBLICATIONS

Office Action issued in Brazil for Application No. 112018010154-0 dated Jan. 28, 2020 (5 pages). English translation included.
Office Action issued in Russia for Application No. 20181217651 dated Jan. 30, 2020 (7 pages). English translation included.
Office Action issued in Japan for Application No. 2018-526878 dated Dec. 7, 2020 (14 pages). English translation included.

* cited by examiner

FILTER MANUFACTURING APPARATUS

This application is a divisional of U.S. application Ser. No. 16/066,452, filed Jun. 27, 2018, which is a U.S. National Stage Application of International Application No. PCT/EP2016/082787, filed Dec. 28, 2016, which was published in English on Jul. 6, 2017, as International Publication No. WO 2017/114871 A1. International Application No. PCT/EP2016/082787 claims priority to European Application No. 15203076.3 filed Dec. 30, 2015, the disclosures of which are incorporated by reference herein in their entirety.

FIELD

The present invention relates to an apparatus for the production of filters for aerosol-forming articles.

BACKGROUND

It is known in the tobacco industry to make paperless filter rods—also called non-wrapped filters or acetate (NWA)—using a continuous strip of filtering material, normally cellulose acetate, which is continuously fed through an impregnation station, at which the strip is impregnated with a plasticizer, for example triacetin, and is then transformed, by means of pressurized air, into a generally cylindrical tow band, which is caused to advance along a longitudinal through channel of a forming beam comprising a first portion, in this case a stabilization portion, and a second portion, in this case a drying portion. Along the first portion, the hardening substance in the tow band is caused to react by means of heat, such as blowing steam, or microwave. Along the second portion, the tow band, previously heated or moistened, is dried and cooled so as to come out of the forming beam in the form of a continuous rod having a determined stable section and relatively high axial rigidity.

This continuous rod is hence preferably fed, again with continuous motion, to a cutting station to be cut into filter segments of determined length.

These filters segments are then coupled to other components so as to form an aerosol-forming article. In an aerosol-forming article, the diameter of the various components is standardized and kept substantially unchanged for each aerosol-forming article type. Therefore, also the diameter of the continuous rod hardened in the way above described needs to be controlled and preferably kept substantially identical to the diameters of the other components to form an aerosol-forming article having an uniform external surface. Aerosol-forming articles having variation in diameter or indentations need to be rejected or discarded because they do not fulfill the desired specifications.

However, the realization of a filter rod having a well-defined diameter is particularly complex in case of non-wrapped filters because commonly the wrapping paper enveloping the filter rod keeps the filter material confined within a certain diameter fixed by the wrapping paper itself. Without the aid of the wrapping paper, the non-wrapped filter needs to be stabilized at a given diameter without added material.

There is therefore a need of an apparatus to produce a filter component whose diameter can be accurately controlled and pre-determined. Further, the achievement of a pre-determined diameter during production should be simple and reliable, minimizing wasted material.

SUMMARY

The invention refers to a filter manufacturing apparatus comprising: a feed path adapted to continuously feed a filter material along a longitudinal transport direction; a forming device connected to a terminating end of the feed path and adapted to form the filter material into a rod-shaped continuous filter body and deliver the formed continuous filter body, the forming device including: a tubular element adapted to allow the filter material to pass therethrough to form the filter material into the continuous filter body and a heat source adapted to heat the filter material passing in the tubular element. Further, the apparatus comprises a diameter measuring device positioned at the outlet of the forming device and adapted to measure a diameter of the continuous filter body.

According to the invention, a diameter measuring device is included in the apparatus to manufacture a filter or a filter component. The measuring device is located downstream the forming device which shapes the filter material, such as filter tow, in a rod for the filter or filter component, by hardening a bonding material—such as a plasticizer—present within the filter material. Placing a diameter measuring device downstream the forming device before further processing of the filter material allows checking at a very early stage of the filter realization process whether the diameter of the filter body is within the desired specifications. In this way, in case of a measurement indicating a filter body having a diameter outside the desired specifications, one or more parameters of the filter forming process can be rapidly changed and the amount of wasted material can be minimized.

The filter material may comprise any suitable material or materials. Examples of suitable materials include, but are not limited to, cellulose acetate, cellulose, reconstituted cellulose, polylactic acid, polyvinyl alcohol, nylon, polyhydroxybutyrate, polypropylene, paper, thermoplastic material, such as starch, non-woven materials and combinations thereof. One or more of the materials may be formed into an open cell structure. Preferably, the filter material comprises cellulose acetate tow.

The filter material may include additional material, either in a final filter segment or in one or more additional elements incorporated in the filter. For example, the additional material may be incorporated into fibrous filter tow of the filter segment or an additional filter element. For example, the filter may include a sorbent material. The term "sorbent" refers to an adsorbent, an absorbent, or a substance that may perform both of these functions. The sorbent material may comprise activated carbon. The sorbent may be incorporated into the filter segment in which the capsule is embedded. More preferably, however, the sorbent is incorporated into an additional filter element upstream of the filter segment. Alternatively or additionally, the filter may include an adhesive, a plasticizer or flavor release agent, or a combination thereof.

Preferably, the filter material includes a plasticizer, which has the function of a bonding constituent. In non-wrapped filters, as mentioned, the density or stiffness of the filter material needs to be higher than in a standard wrapped filter due to the fact that there is no restraint action by the wrapping paper on the filter material, which needs to keep a well-defined shape, and also diameter, without any additional external material.

A stiffer filter material may be needed not only in case of non-wrapped filters, but also in the realization of special filter components, such as hollow filter plugs. In hollow filters components, the component includes a through hole which weakens the overall structure of the component itself, such as a filter plug. In order to avoid deformations of the hollow filter components, for example by compression of the filter, it is preferred that the material in which the hollow filter is realized is stiffer than the material in which a standard filter plug is formed. For this purpose, a procedure similar to that used for the production of non-wrapped filters is preferably used.

The continuous filter body produced with the apparatus of the invention may be then cut in portions to form filter components, which may therefore be wrapped or non-wrapped.

Filters realized with the apparatus of the invention may advantageously be used in aerosol-forming articles. Aerosol forming articles according to the present invention may be in the form of filter cigarettes or other smoking articles in which tobacco material is combusted to form smoke. The present invention additionally encompasses articles in which tobacco material is heated to form an aerosol, rather than combusted, and articles in which a nicotine-containing aerosol is generated from a tobacco material, tobacco extract, or other nicotine source, without combustion or heating. Aerosol forming articles according to the invention may be whole, assembled aerosol forming articles or components of aerosol forming articles that are combined with one or more other components in order to provide an assembled article for producing an aerosol, such as for example, the consumable part of a heated smoking device.

DETAILED DESCRIPTION

An aerosol forming article may be an article that generates an aerosol that is directly inhalable into a user's lungs through the user's mouth. An aerosol forming article may resemble a conventional smoking article, such as a cigarette and may comprise tobacco. An aerosol forming article may be disposable. An aerosol forming article may alternatively be partially-reusable and comprise a replenishable or replaceable aerosol forming substrate.

The apparatus comprises a feed path to transport the filter material along a transport direction.

In order to shape the filter material, which preferably includes a plasticizer, into a continuous rod further used for the production of filters, a forming device connected to a terminating end of the feed path and adapted to form the filter material into a rod-shaped continuous filter body and deliver the formed continuous filter body is used. The forming device comprises a tubular element adapted to allow the filter material to pass therethrough to form the filter material into the continuous filter body. The inner walls of the tubular element preferably define the outer surface of the continuous filter body and determine, among others, its diameter. The inner walls of the tubular element "compress" the filter material into a rod. Further, in order to render the filter material stiff and with a substantially constant shape, a heat source adapted to heat the filter material passing in the tubular element is also provided, so that the possibly present bonding material, such as the plasticizer possibly present within the filter material, provides for the bonding among the fibers of the filter material.

The heat source could be for example a microwave source, an infrared source, or a steam source such as water steam. The steam source may have a temperature of more than about 120 degrees Celsius, for example of more than about 200 degrees Celsius. The selection of the source depends on the type of plasticizer and on the way in which the plasticizer can be activated.

Preferably, the filter material is heated at a temperature of at least about 30 degrees Celsius, preferably of at least about 35 degrees Celsius, preferably of at least about 40 degrees Celsius.

Preferably, the heat source is located within the tubular element. Therefore the filter material is heated while is travelling within the tubular element.

More preferably, the tubular element may include one or more nozzle to eject steam towards the filter material.

Plasticizers are additives that increase the plasticity or fluidity of a material.

In the forming device, heat is transferred to the filter material in order to bind the filter material due to the plasticizer presence. In order to speed up the process of filter formation, the heat from the filter body may need to be dissipated as quickly as possible in order to obtain a final filter body apt to be further processed. The forming device may comprise a cooling section. The cooling section is preferably downstream the heat source. The cooling section may allow to cool the filter body fast, that is faster than without the cooling section. The cooling may also improves the surface quality of the filter body. The cooling section may apply pressured air at room temperature to the continuous filter body.

Downstream the forming device, a diameter measuring device is positioned at the outlet of the forming device. Preferably, the distance between the diameter measuring device and the heat source of the forming device is below about 2 meters, preferably below about 1 meter, preferably below about 0.5 meter. Preferably, the period between the moment the filter material is exposed to the heat source and the moment the diameter is measured by the diameter measuring device is below about 5 seconds, preferably below about 1 second, preferably below about 0.2 second.

The diameter measuring device is adapted to measure a diameter of the continuous filter body. In this way, possible dimensions of the continuous filter rod outside specifications, or asymmetries of the continuous filter body can be immediately detected at an early stage of the filter manufacturing process and parameters of the process which takes place inside the tubular element can be changed or varied so that the correct dimensions of the continuous filter body can be achieved. The diameter of the continuous filter rod indeed depends—among others—on the heat source and on the amount of heat transferred to the filter material.

As used herein, by "diameter" is meant the maximum transverse dimension of the continuous filter body exiting the tubular element.

As used herein, the term "rod" is used to denote a generally cylindrical element of substantially circular, oval or elliptical cross-section.

A check of the diameter of the continuous filter rod at the outlet of the forming device, allows minimizing the wasted material because defects in the diameter can be detected very early. It is then possible to correct and change some parameters of the rod forming process in order to modify the diameter of the rod exiting the forming device. This is in particular useful when a different filter material is used. For example, in case of tow material, when a bundle of it is finished, it has to be replaced by another one in order to continue the filter manufacturing process. The "new" bundle may include filter material which might not have exactly the same characteristics as the previous one. Therefore slight changes in the diameter of the filter body may take places even keeping the process parameters unaltered. In order to detect as early as possible these changes, the apparatus of the invention is used.

Preferably, the diameter measuring device comprises a tubular measuring element or a U-shaped measuring element, located downstream the tubular element, adapted to allow the continuous filter body to pass therethrough to measure the diameter of the continuous filter body. In order to correctly check the diameter of the continuous filter body exiting the forming device, preferably the diameter measuring device comprises a tubular or U-shaped element through which the continuous filter body is inserted. The measure can be performed in this way along the whole radial extension of the continuous filter body.

Preferably, the diameter measuring device comprises one or more nozzles to blow a pressurized fluid so as to measure pressure fluid variations to determine the diameter of the continuous filter body. The diameter measuring device may include a commercially available device named Solex Metrology produced by Kep technologies. The non-contact method employed by Solex columns uses air at constant pressure blown through orifices in a measuring head specific for the apparatus for producing filters, in which there is a calibrated circular cylinder. If the distance between one of the measuring head orifices and the surface of the cylinder being measured varies, the air flow changes and this causes a variation in pressure that is detected by a manometer.

The measuring device may comprise a laser source apt to measure the diameter of the continuous filter body. Advantageously, the measuring device comprises a gauge head including a CCD sensor and laser diodes as light sources. The calculation of the diameter of the filter rod is obtained by diffraction analysis to calculate the outer diameter. The gauge head performs a non-contact measuring of the diameter. For example, the commercial equipment produced by SIKORA called laser series, either 2000 or 6000, is used. The laser diodes may be positioned at specified angles in the U-shaped or tubular measuring element of the measuring device. Preferably, the heat source comprises a steam generator in fluid communication to the tubular element to supply steam to the filter material. The heat source may include a steam source and the steam may react with the plasticizer hardening the filter material including the plasticizer. The steam is preferably water steam. The supply of steam is a rather economical way of supplying heat to the filter material flowing within the tubular element.

More preferably, the filter manufacturing apparatus comprises a control unit adapted to receive signals from the diameter measuring device relative to the diameter of the continuous filter body and to send signals to the steam generator to vary the steam production or to a display in order to visualize the measurements. The presence of a diameter measuring device allows varying the process parameter in the forming device so as to change the same if the sensed diameter of the continuous filter body is outside the desired specifications. A variation of the steam generation may change the final diameter of the filter body and therefore, depending on the results of the diameter measurements, the production of steam can be varied accordingly. This variation can be done automatically, by the control unit itself, or by an operator, who checks the value of the diameter of the filter body displayed in the display.

The steam accelerates the plasticizing effect, making the filter material hard in a relatively short time, so that the filter material can expand only of a rather “small” amount before it is completely hardened and possibly wrapped. Therefore a “high” steam yields a filter body having a relatively small diameter. On the other hand, “low” steam means less plasticizing of the filter material in the same amount of time, that is, the filter material gets hard in a longer time period, and the filter material can expend more before it is wrapped. Therefore a filter body having a “larger” diameter is obtained More preferably, the control unit is adapted to compare a signal relative of the measured diameter to a reference diameter and to change a parameter in the steam generator to increase vapor pressure in case the measured diameter is bigger than the reference diameter of more than a given amount. This change of the parameter may be performed by an operator. Advantageously, the filter manufacturing apparatus comprises a pressurized fluid generator to blow pressurized fluid towards the filter tow material to transport the filter tow material into the tubular element. More preferably, the filter manufacturing apparatus comprises a control unit adapted to receive signals from the diameter measuring device relative to the diameter of the continuous filter body and to send signals to the pressurized fluid generator to vary the pressurized fluid production or to a display in order to visualize the measurements. The presence of a diameter measuring device allows varying the process parameter in the filter manufacturing apparatus so as to change the same if the sensed diameter of the continuous filter body is outside the desired specifications. A variation of the pressurized fluid may change the final diameter of the filter body and therefore, depending on the results of the diameter measurements, the production of pressurized fluid can be varied accordingly. This variation can be done automatically, by the control unit itself, or by an operator, who checks the value is of the diameter of the filter body displayed in the display.

Even more preferably, the control unit is adapted to compare a signal relative of the measured diameter to a reference diameter and to change a parameter in the pressurized fluid generator to increase fluid pressure in case the measured diameter is bigger than the reference diameter of more than a given amount. This change of the parameter may be performed by an operator.

Preferably, the filter manufacturing apparatus comprises a wrapping section located downstream the forming device to wrap the continuous filter body in a wrapping sheet. Advantageously, the filter body exiting the forming device is wrapped in wrapping sheet, such as wrapping paper, so that its diameter, which has been checked by the diameter measuring device, cannot further change or can change only of a very limited amount.

More preferably, the wrapping section includes a glue nozzle to distribute glue onto the wrapping sheet so as to close the wrapping sheet around the continuous filter body.

Preferably, the cooling unit is located downstream the tubular element and upstream the wrapping section, to cool down the continuous filter body before it is wrapped. Also the cooling speed may alter the diameter of the continuous filter body. A rapid cooling does not allow further increase in diameter of the continuous filter body, or it allows only a minimal diameter increase, because the plasticizer, at low temperature, “freezes” the filter material in the acquired shape. Therefore, a rapid cooling leads to a smaller final diameter of the continuous filter body compared to a slower cooling.

Advantageously, the filter manufacturing apparatus comprises a heating section located downstream the tubular element to heat up the wrapped continuous filter body. More preferably, the heating section is located downstream or at the wrapping section. The heating section preferably provided in a location downstream the glue nozzles distributing glue on the wrapping sheet. The glue is preferably used in order to close the wrapping sheet around the filter body firmly, so that it does not “re-open” again. Preferably cold glue is used, which needs heat in order to correctly connect together different portions of the wrapping sheet. Cold glues are commonly water-based solutions. The adhesive solids are dissolved in water, usually by cooking. A bond is formed when almost all of the water is lost via penetration or absorption into substrates, for example by means of heating. More preferably, the heating section is located downstream the diameter measuring apparatus. Advantageously, the filter manufacturing apparatus comprises a plasticizer addition unit arranged upstream an inlet of the tubular element and adapted to spout a plasticizer to add the plasticizer to the filter material. In order to obtain a substantially rigid filter body at the outlet of the forming unit, a plasticizer is used in order to impregnate the filter fibers and to harden the latter when heat is provided.

Preferably, the tubular element includes a tapered portion, so that its internal diameter decreases along the longitudinal transport direction. The tapered portion compresses the filter material so that a rod can be formed by pressure of the inner wall of the tubular element.

BRIEF DESCRIPTION OF THE DRAWINGS

The invention will be further described, by way of example only, with reference to the accompanying drawings in which.

Figure 1:
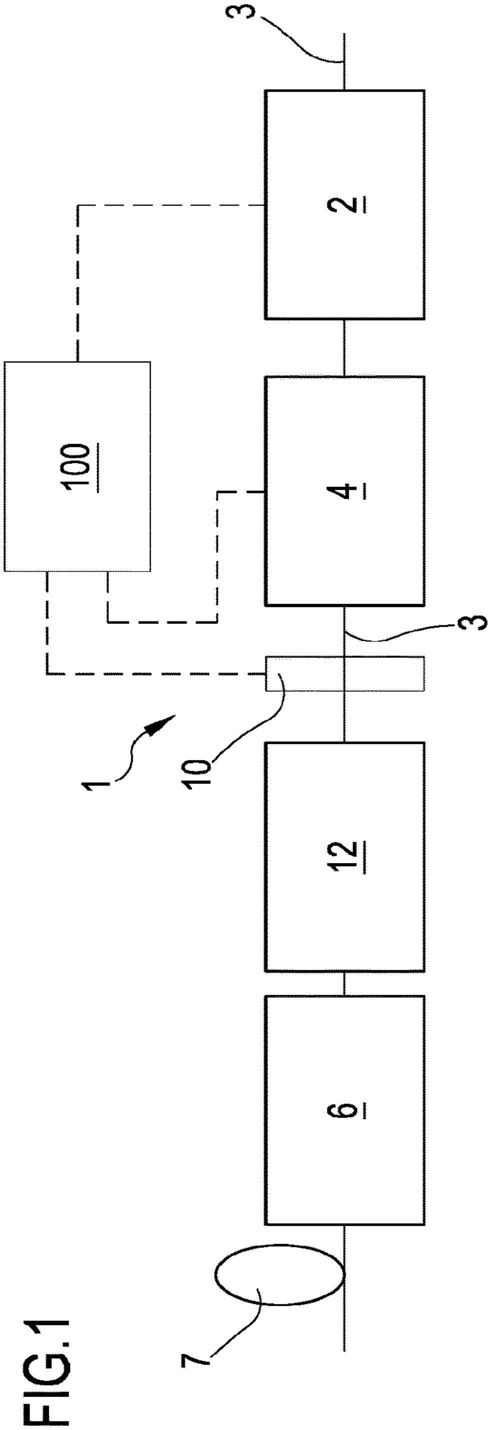
FIG. 1 is a schematic view of an apparatus for forming a filter according to the invention.
Figure 2:
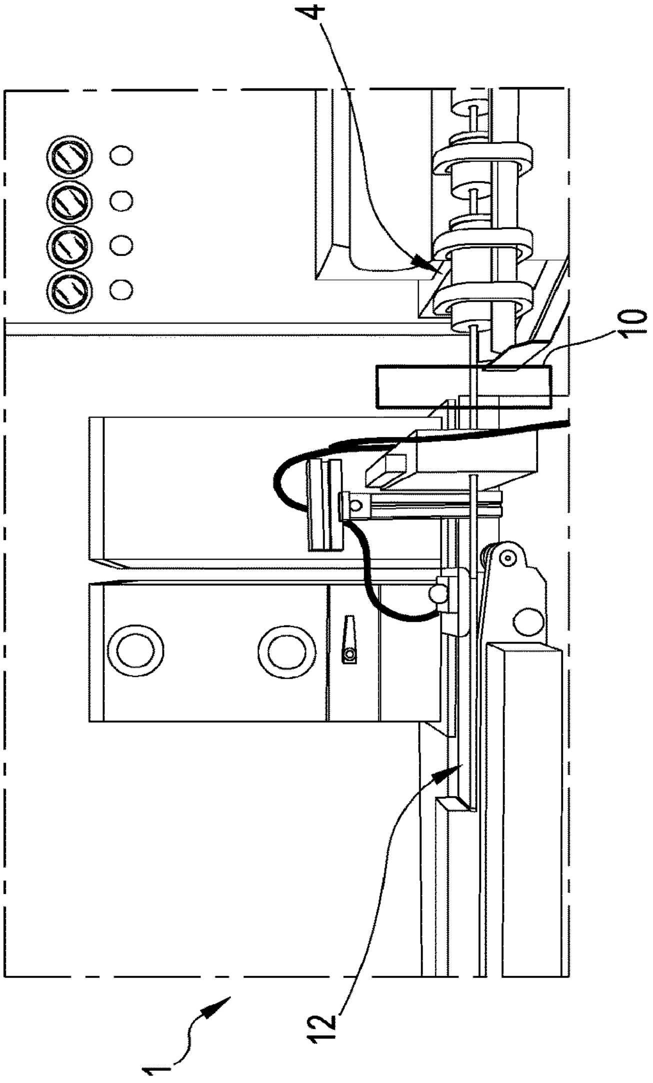
FIG. 2 is a perspective view of a portion of the apparatus of FIG. 1.

Numeral 1 in FIG. 1 indicates an apparatus as a whole, for producing filter rods (not shown) or filters components, preferably for aerosol-generating articles.

Apparatus 1 comprises a transport device 3 to transport along a transport or feeding direction filter material, for example cellulose acetate or filter tow. Further, the apparatus 1 includes an inlet unit 2 adapted to form a continuous stream or strip of filter material, moistened with a hardening fluid or plasticizer, such as triacetin. The filter material is fed to the inlet unit 2 by the transport device 3. The moistening of the filter material with plasticizer takes place in a plasticizer unit, not shown in the drawings and known in the art. The plasticizer unit is located upstream the inlet unit 2. Downstream the inlet unit 2, the apparatus includes a rod forming unit 4, arranged in series to the inlet unit 2 and adapted to receive the flow or strip of filter material and to cause the hardening material to react to transform the filter material into a continuous axially rigid rod filter. Advantageously, the apparatus further comprises a wrapping unit 12 and a heating unit 6. Further, the apparatus may comprise a cutting unit 7, normally a rotating cutting head of known type, arranged downstream of the rod forming unit 4 and adapted to cut the continuous filter rod crosswise into filter segments (not shown).

Wrapping unit 12, transport device 3 and cutting unit 7 are known in the art and not further detailed below.

Figure 4:
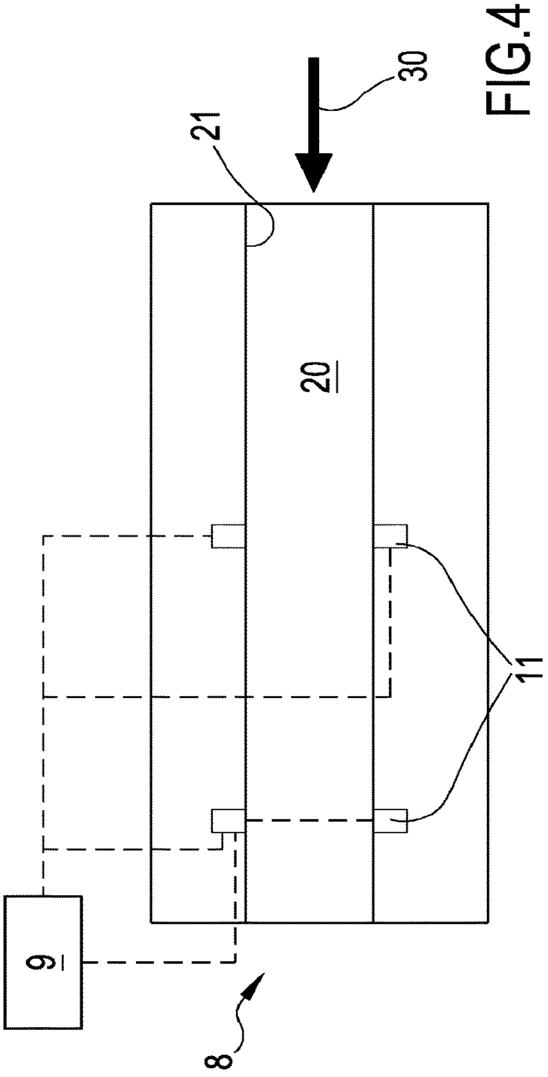
FIG. 4 is a schematic lateral view in section of an element of the apparatus of FIG. 1.

The rod forming unit 4 comprises a tubular element 8, shown in an enlarged view in FIG. 4, adapted to receive the filter material saturated with hardening material, for example along the arrow 30 depicted in FIG. 4 which is the transport direction of the transport device 3, and to shape the filter material crosswise so as to transform it into a moist, generally cylindrical filter body and to advance the tow body in the feed direction of the mentioned arrow to the further components of the apparatus 1.

Preferably the filter material is pushed inside the tubular element 8 along arrow 30 by means of a fluid jet, for example a pressurized air jet, formed by a pressurized fluid generator (not shown in the drawings).

Tubular element 8 defines a through hole 20 through which the filter material can pass. Preferably, the through hole 20 comprises an inner surface 21 which compresses the filter material to form a substantially cylindrical rod-like shape. Further, preferably the tubular element 8 includes a steam generator 9 comprising one or more nozzles 11 which can emit steam in the interior of the tubular element 8. The steam can harden the plasticizer present in the filter material and transform it into the substantially rigid filter rod or body.

The apparatus 1, downstream the outlet of the tubular element, comprises a cooling unit (not shown in the drawings) to cool down the continuous filter body by means of compressed air, preferably at room temperature.

Figure 3:
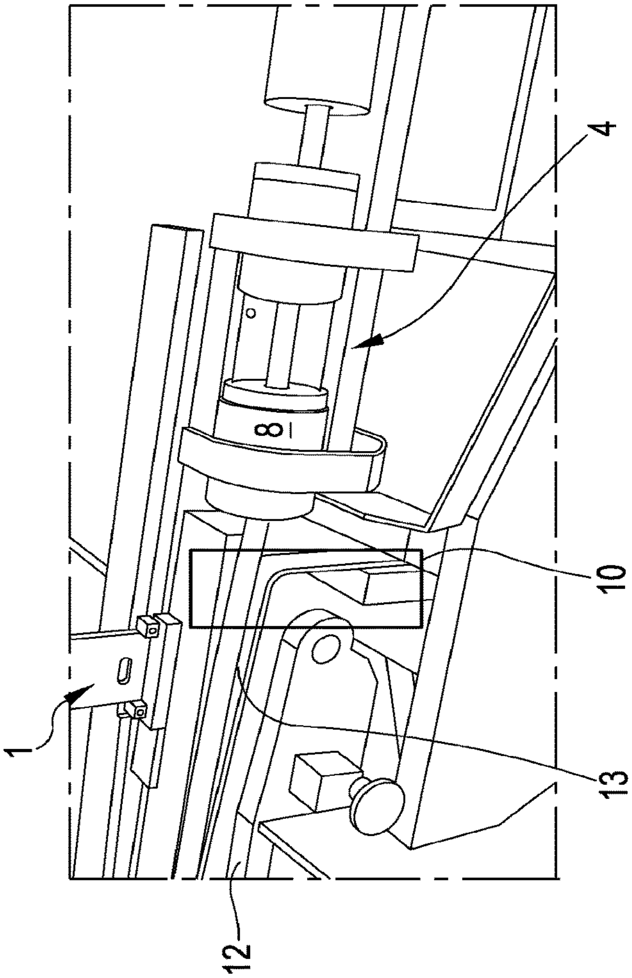
FIG. 3 is a further perspective view of a portion of the apparatus of FIG. 1.

Further, the apparatus 1 includes the wrapping unit 12 located downstream the rod forming unit 4 and the cooling unit, which wraps in a wrapping paper 13 (see FIG. 3) the filter rod exiting from the tubular element 8. The wrapping unit 12 includes nozzles (not visible in the drawings) to distribute cold glue onto the wrapping paper 13.

Further, the apparatus comprises a heating unit 6 located downstream the wrapping unit 12, in order to heat the cold glue and to obtain a proper closure of the wrapping paper 13 onto the hardened filter rod.

The apparatus 1 further comprises a diameter measuring device 10 located between the tubular element 8 and the wrapping unit 12. The diameter measuring device 10 is apt to measure the diameter of the filter body exiting the tubular element. The diameter measuring unit preferably includes a sleeve or U-shaped element (not shown) through which the continuous filter body can pass. The diameter measuring unit includes preferably a laser system and a display (both not visible) where the measurements of the diameter of the filter rod exiting the tubular element 8 are shown. Alternatively, the diameter measuring unit is preferably in communication with a central control unit 100 to which it sends signal relative to the diameter measurements of the filter body at the output of the tubular element 8.

Control unit 100 is adapted to receive the signals from measuring device 10 and to command the rod forming unit 4. Preferably, central control unit 100 commands the steam generator 9 and the pressurized fluid generator (not visible in the drawings). The central control unit 100 is adapted to change the pressure of the steam produced by the steam generator and, in alternative or in addition, the pressure of the fluid pushing the filter material into the tubular element 8 on the basis of the measurements from the diameter measuring unit 10. For example, as soon as the measuring unit 10 measures diameter variations above a given threshold, the pressure of the steam and/or the pressure of the fluid are changed so that the diameter of the continuous filter body at the exit of the tubular element 8 returns within the desired specifications. Alternatively or in addition, the cooling speed can be changed in the cooling unit, increasing or decreasing the flow rate of air flowing against the filter rod. In this way the effect of the plasticizer can be accelerated or decelerated.

Alternatively, an operator checking the display of the measuring device 10 adapts the settings or parameters of the apparatus as mentioned above with reference to the control unit 100 in case the diameter of the rod exiting the tubular element 8 is outside the required specifications.

The invention claimed is:

1. A filter manufacturing apparatus comprising:

a feed path to continuously feed a filter material along a longitudinal transport direction;

a forming device connected to a terminating end of the feed path to form the filter material into a rod-shaped continuous filter body and deliver the continuous filter body, the forming device including:

a tubular element with through hole allowing the filter material to pass therethrough to form the filter material into the continuous filter body;

a heat source to heat the filter material passing in the tubular element;

a diameter measuring device positioned at an outlet of the forming device to measure a diameter of the continuous filter body;

a pressurized fluid generator to blow pressurized fluid towards the filter material to transport the filter material into the tubular element;

a control unit configured to receive signals from the diameter measuring device relative to the diameter of the continuous filter body and to send signals to the pressurized fluid generator to vary pressurized fluid production or to a display in order to visualize the measurement and configured to compare a signal relative of measured diameter to a reference diameter and to change a parameter in the pressurized fluid generator to increase fluid pressure in case the measured diameter is bigger than the reference diameter of more than a given amount.

2. The filter manufacturing apparatus according to claim 1, wherein the diameter measuring device comprises a tubular measuring element or a U-shaped measuring element, located downstream the tubular element, to allow the continuous filter body to pass therethrough to measure the diameter of the continuous filter body.

3. The filter manufacturing apparatus according to claim 2, wherein the diameter measuring device comprises one or more nozzles to blow a pressurized fluid to measure pressure fluid variations to determine the diameter of the continuous filter body.

4. The filter manufacturing apparatus according to claim 2, wherein the diameter measuring device comprises a laser source apt to measure the diameter of the continuous filter body.

5. The filter manufacturing apparatus according to claim 1, comprising a wrapping section located downstream the forming device to wrap the continuous filter body in a wrapping sheet.

6. The filter manufacturing apparatus according to claim 5, wherein the wrapping section includes a glue nozzle to distribute glue onto the wrapping sheet to close the wrapping sheet around the continuous filter body.

7. The filter manufacturing apparatus according to claim 6, comprising:

a heating section located downstream the tubular element to heat up the wrapped continuous filter body.

8. The filter manufacturing apparatus according to claim 7, wherein the heating section is located downstream the diameter measuring device.

9. The filter manufacturing apparatus according to claim 1, comprising:

a plasticizer addition unit arranged upstream an inlet of the tubular element to spout a plasticizer to the filter material.

10. The filter manufacturing apparatus according to claim 1, wherein the tubular element includes a tapered portion, so that its internal diameter decreases along the longitudinal transport direction.

* * * * *